(12) United States Patent
Arnold

(10) Patent No.: US 10,836,592 B1
(45) Date of Patent: Nov. 17, 2020

(54) PORTABLE WHEELCHAIR RAMP ASSEMBLY

(71) Applicant: Douglas Arnold, San Antonio, TX (US)

(72) Inventor: Douglas Arnold, San Antonio, TX (US)

( * ) Notice: Subject to any disclaimer, the term of this patent is extended or adjusted under 35 U.S.C. 154(b) by 0 days.

(21) Appl. No.: 16/450,267

(22) Filed: Jun. 24, 2019

(51) Int. Cl.
*B65G 69/30* (2006.01)
*A61G 3/06* (2006.01)

(52) U.S. Cl.
CPC .............. *B65G 69/30* (2013.01); *A61G 3/061* (2013.01)

(58) Field of Classification Search
CPC .. B65G 69/30; E04F 11/002; E04F 2011/005; E04F 2011/007; A61G 3/061; A61G 3/06
See application file for complete search history.

(56) References Cited

U.S. PATENT DOCUMENTS

| | | | | |
|---|---|---|---|---|
| 4,373,756 A * | 2/1983 | Purdy | ...................... | A47C 7/68 297/149 |
| 4,436,339 A * | 3/1984 | Albers | .................... | A47B 23/02 108/152 |
| 4,528,711 A * | 7/1985 | Packer | .................... | B65G 69/30 14/69.5 |
| 5,026,114 A * | 6/1991 | Miller | ...................... | A47C 7/68 108/49 |
| 5,287,580 A * | 2/1994 | Nelson | .................... | B65G 69/30 14/71.3 |
| 5,588,663 A * | 12/1996 | Rundle | ..................... | A47C 7/70 108/44 |
| 5,671,496 A * | 9/1997 | Smith | ..................... | A61G 3/061 14/69.5 |
| 5,799,964 A * | 9/1998 | Chao | ........................ | A47C 7/70 280/304.1 |
| 6,463,613 B1 * | 10/2002 | Thompson | ............. | A61G 3/061 14/69.5 |
| 6,708,361 B1 * | 3/2004 | Emerson, Jr. | ........... | B65G 69/30 14/69.5 |
| 7,210,735 B2 * | 5/2007 | Lang | ........................ | A61G 5/10 280/304.1 |
| 7,310,843 B1 * | 12/2007 | Mitchell | ............... | B65D 88/542 14/69.5 |
| 8,292,314 B1 * | 10/2012 | Schaal | ..................... | A61G 5/10 280/250.1 |
| 9,254,044 B2 * | 2/2016 | Dudik | ...................... | A47C 7/70 |
| D758,612 S * | 6/2016 | Skaar | .......................... | D25/48.2 |
| 2009/0188035 A1 * | 7/2009 | Luxton | ................... | A47K 3/281 4/604 |
| 2010/0011520 A1 * | 1/2010 | Wollborg | ............... | A61G 3/061 14/69.5 |

\* cited by examiner

*Primary Examiner* — Abigail A Risic

(57) ABSTRACT

A portable wheelchair ramp assembly includes a ramp that is removably coupled to an armrest of a wheelchair such that the ramp is accessible to a user in the wheelchair. The ramp has an axle slot therein to accommodate a wheel axle of the wheelchair when the ramp is removably coupled to the wheelchair. The ramp is positionable to extend across uneven terrain to facilitate the wheelchair to cross the uneven terrain. A plurality of engagements is each coupled to the ramp and each of the engagements engages an arm rest on the wheelchair for storing the ramp. A plurality of brackets is each coupled to the arm rest of the wheelchair. Each of the brackets releasably engages a respective one of the engagements for retaining the ramp on the wheelchair for storage.

7 Claims, 4 Drawing Sheets

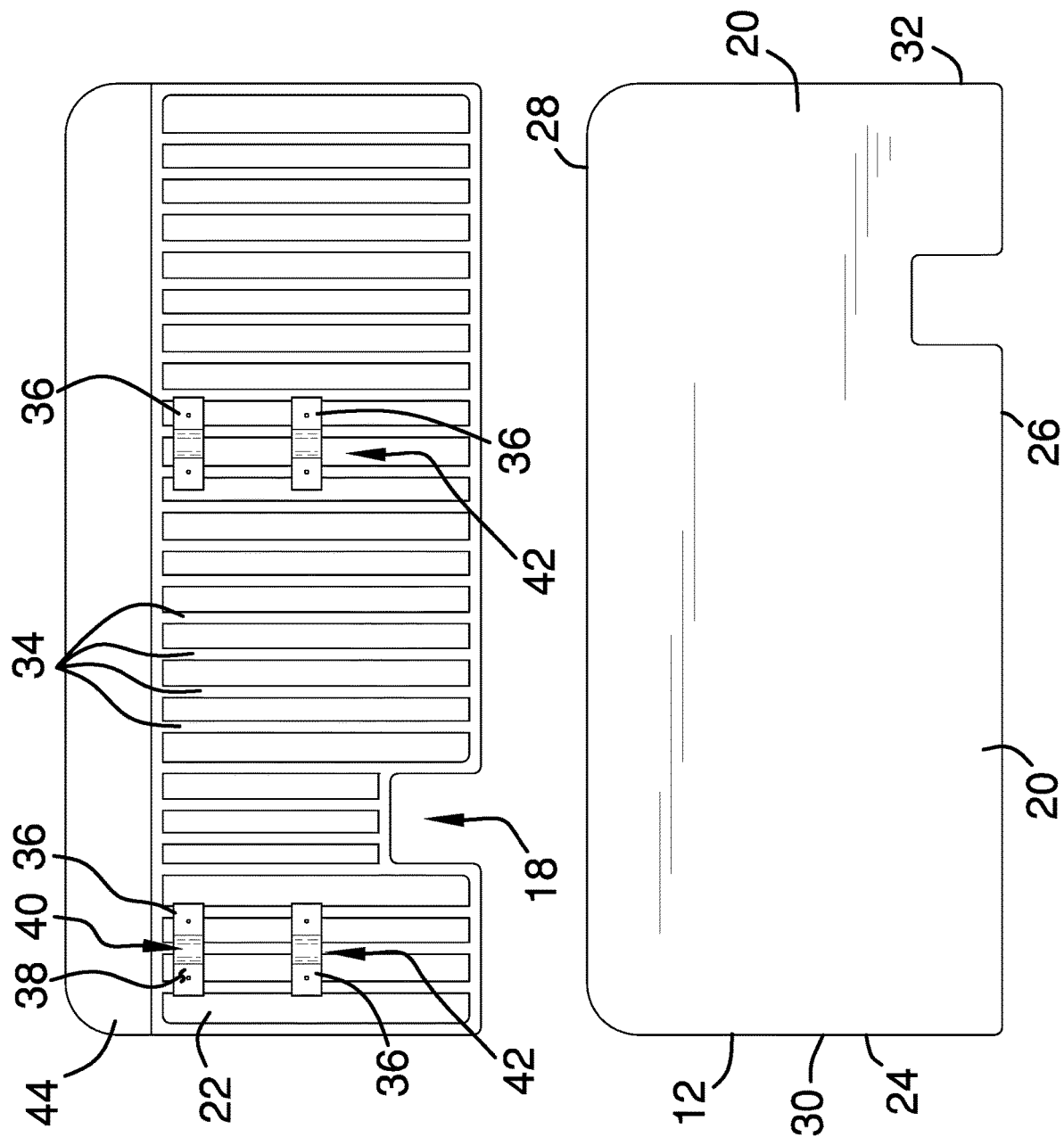

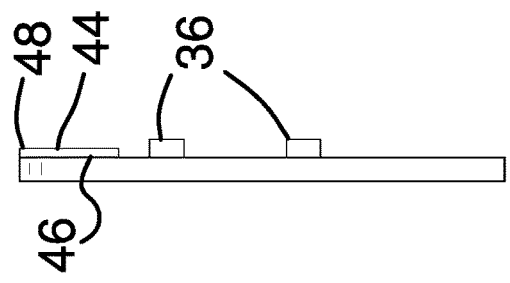
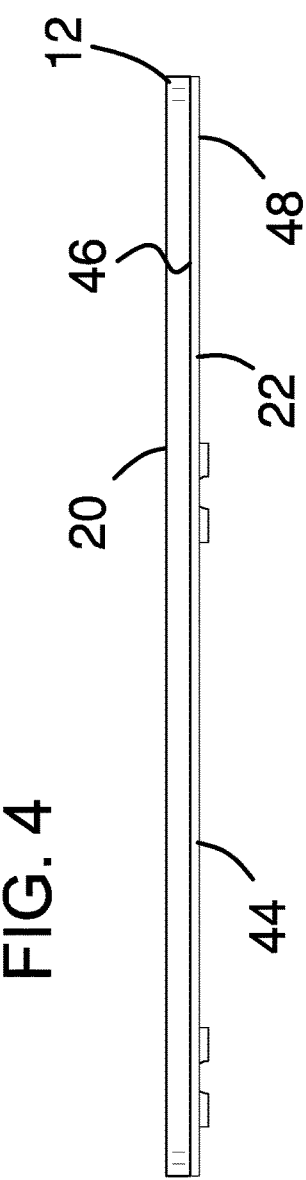
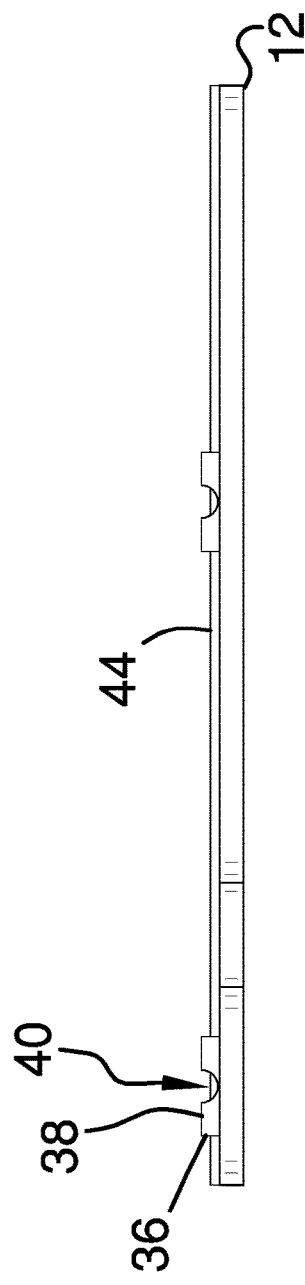
FIG. 4
FIG. 5
FIG. 6

PORTABLE WHEELCHAIR RAMP ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to portable ramp devices and more particularly pertains to a new portable ramp device for facilitating a wheelchair to travel over uneven terrain.

BRIEF SUMMARY OF THE INVENTION

An embodiment of the disclosure meets the needs presented above by generally comprising a ramp that is removably coupled to an armrest of a wheelchair such that the ramp is accessible to a user in the wheelchair. The ramp has an axle slot therein to accommodate a wheel axle of the wheelchair when the ramp is removably coupled to the wheelchair. The ramp is positionable to extend across uneven terrain to facilitate the wheelchair to cross the uneven terrain. A plurality of engagements is each coupled to the ramp and each of the engagements engages an arm rest on the wheelchair for storing the ramp. A plurality of brackets is each coupled to the arm rest of the wheelchair. Each of the brackets releasably engages a respective one of the engagements for retaining the ramp on the wheelchair for storage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a bottom view of an embodiment of the disclosure.

FIG. 3 is a top view of an embodiment of the disclosure.

FIG. 4 is a right side view of an embodiment of the disclosure.

FIG. 5 is a top view of an embodiment of the disclosure.

FIG. 6 is a bottom view of an embodiment of the disclosure.

DETAILED DESCRIPTION OF THE INVENTION

Figure 1:
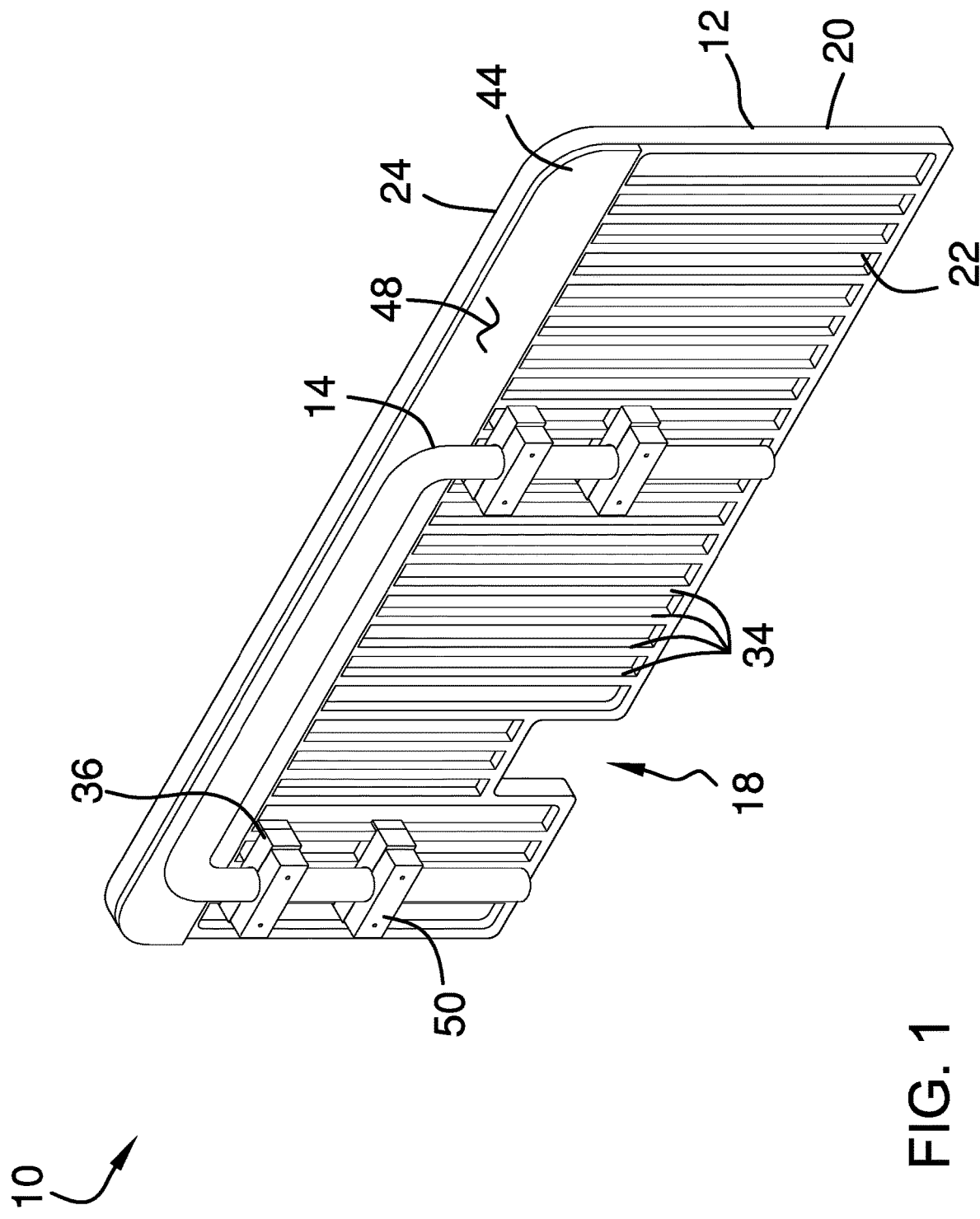
FIG. 1 is a perspective view of a portable wheelchair ramp assembly according to an embodiment of the disclosure.
Figure 7:
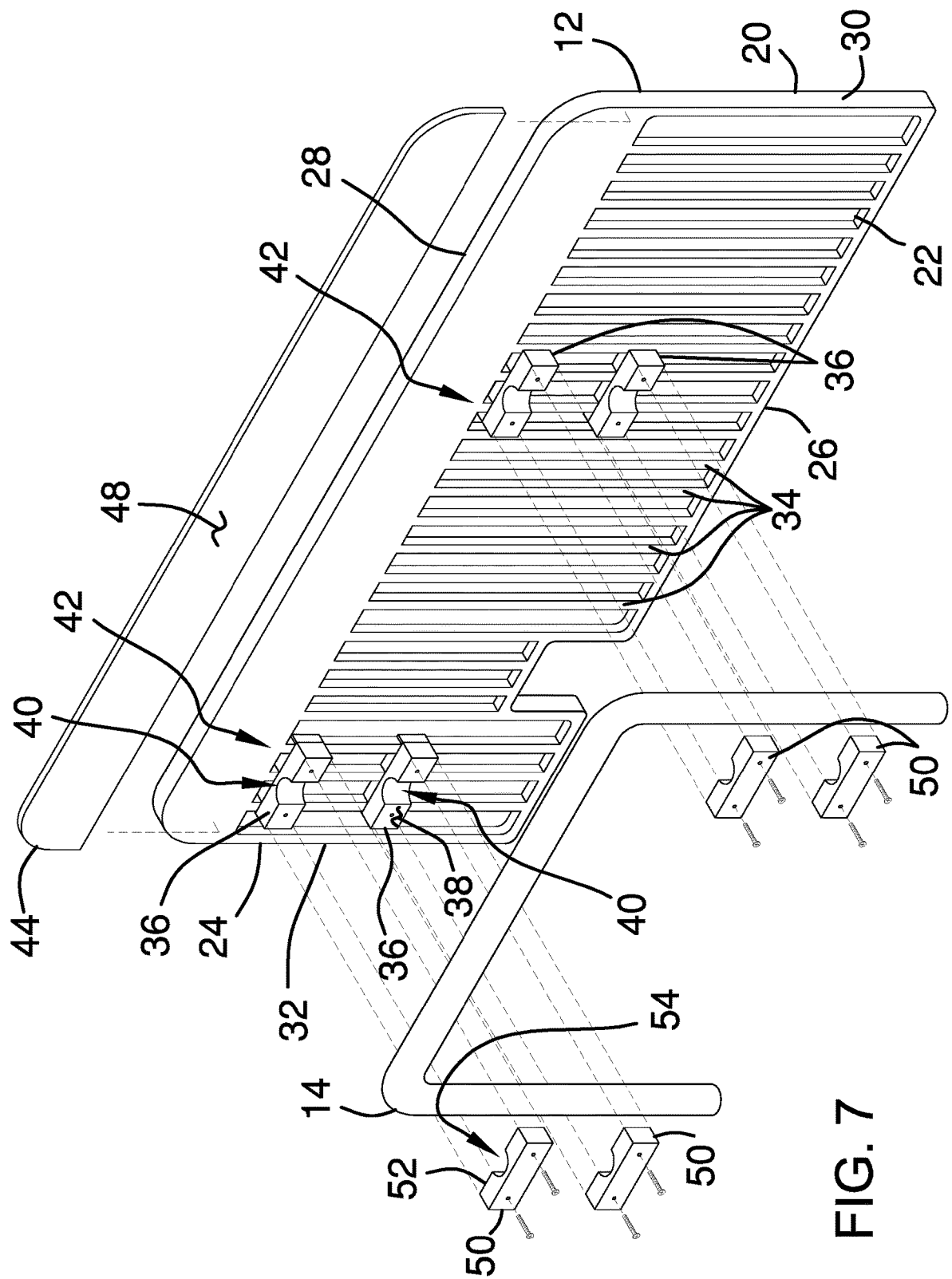
FIG. 7 is an exploded perspective view of an embodiment of the disclosure.

With reference now to the drawings, and in particular to FIGS. 1 through 7 thereof, a new portable ramp device embodying the principles and concepts of an embodiment of the disclosure and generally designated by the reference numeral 10 will be described.

As best illustrated in FIGS. 1 through 7, the portable wheelchair ramp assembly 10 generally comprises a ramp 12 that is removably coupled to an armrest 14 of a wheelchair. In this way the ramp 12 is accessible to a user in the wheelchair. The ramp 12 has an axle slot 18 therein to accommodate a wheel axle of the wheelchair when the ramp 12 is removably coupled to the wheelchair. The ramp 12 is positionable to extend across uneven terrain thereby facilitating the wheelchair to cross the uneven terrain. In this way the wheelchair can cross a roadside curb, a doorway threshold or any other structure that would otherwise be inaccessible for a wheelchair.

The ramp 12 has a top side 20, a bottom side 22 and a perimeter edge 24 extending therebetween, and the perimeter edge 24 has a lower side 26, an upper side 28, a first lateral side 30 and a second lateral side 32. The axle slot 18 extends from the bottom side 22 toward the top side 20, and the axle slot 18 is positioned closer to the first lateral side 30 than the second lateral side 32. The bottom side 22 has a plurality of ribs 34 thereon and each of the ribs 34 extends from the bottom side 22 toward the top side 20 for enhancing rigidity of the ramp 12. The ribs 34 are spaced apart from each other and are distributed between the first lateral side 30 and the second lateral side 32. The bottom side 22 of the ramp 12 is laid against the uneven terrain such that the wheelchair can roll along the top side 20 of the ramp 12. The ramp 12 is comprised of a lightweight material, such as polyvinylchloride or other similar material, such that the ramp 12 can easily be manipulated to a person confined to a wheelchair. The ramp 12 may have a width of at least 36.0 inches and a height of at least 14.0 inches.

A plurality of engagements 36 is each coupled to the ramp 12 and each of the engagements 36 engages an armrest 14 on the wheelchair for storing the ramp 12. Each of the engagements 36 is positioned on the bottom side 22 of the ramp 12 and each of the engagements 36 has a distal surface 38 with respect to the bottom side 22. The distal surface 38 of each of the engagements 36 has a channel 40 therein for conforming to a member of the armrest 14. The channel 40 is concavely arcuate with respect to the distal surface 38.

The plurality of engagements 36 is arranged into a pair of columns 42 of the engagements 36. The columns 42 extend between the upper side 28 and the lower side 26 of the perimeter edge 24 of the ramp 12. Additionally, the columns 42 are spaced apart from each other and are distributed between the first lateral side 30 and the second lateral side 32 of the perimeter edge 24 of the ramp 12. The channel 40 in each of the engagements 36 is oriented to extend along an axis that extends through the upper side 28 and the lower side 26 of the perimeter edge 24.

A grip 44 is coupled to the ramp 12 and the grip 44 is comprised of a resiliently compressible material. The grip 44 frictionally grips the uneven terrain thereby inhibiting the ramp 12 from sliding on the uneven terrain. The grip 44 has a first surface 46 and a second surface 48, and the first surface 46 is bonded to the bottom side 22 of the ramp 12. The grip 44 is aligned with and is coextensive with the upper side 28 of the perimeter edge 24 of the ramp 12.

A plurality of brackets 50 is each of the brackets 50 is coupled to the armrest 14 of the wheelchair. Each of the brackets 50 releasably engages a respective one of the engagements 36 for retaining the ramp 12 on the wheelchair for storage. Each of the brackets 50 has a front face 52 and the front face 52 of each of the brackets 50 has a channel 54 therein for accommodating a member of the armrest 14. Each of the brackets 50 is aligned with a respective one of the engagements 36 when the ramp 12 is positioned on the armrest 14. Moreover, the front face 52 of each of the brackets 50 releasably engages the distal surface 38 of the respective engagement 36 when the ramp 12 is positioned on the armrest 14. Each of the engagements 36 and each of the brackets 50 may include complementary magnets, snaps, pins and receivers or any other type of releasable fastener for retaining the ramp 12 on the armrest 14 for storage.

In use, the ramp 12 is positioned on the armrest 14 of the wheelchair for storage. The ramp 12 is removed from the armrest 14 and the ramp 12 is laid across uneven terrain over which the wheelchair needs to travel. In this way the wheelchair can travel up or down a curb, cross a doorway threshold or travel over any other similar obstacle that would otherwise prevent the wheelchair from crossing. The ramp 12 is picked up when the wheelchair passes across the ramp 12 and the ramp 12 is positioned back on the armrest 14 for storage. In this way a person in the wheelchair can access locations that do not have wheelchair access accommodations.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable wheelchair ramp assembly being configured to be placed across uneven terrain thereby facilitating a wheelchair to cross the uneven terrain, said assembly comprising:

a ramp being removably coupled to an armrest configured for attachment to a wheelchair wherein said ramp is configured to be accessible to a user in the wheelchair, said ramp having an axle slot therein, said axle slot being vertically oriented wherein said axle slot is configured to accommodate a wheel axle of the wheelchair when said ramp is selectively lifted and lowered relative to the wheelchair to removably couple said armrest to the wheelchair, said ramp being positionable to extend across uneven terrain wherein said ramp is configured to facilitate the wheelchair to cross the uneven terrain;

a plurality of engagements, each of said engagements being coupled to said ramp, each of said engagements engaging an arm rest on the wheelchair for storing said ramp;

a grip being coupled to said ramp, said grip being comprised of a resiliently compressible material wherein said grip is configured to grip the uneven terrain thereby inhibiting said ramp from sliding on the uneven terrain; and a plurality of brackets, each of said brackets being coupled to the arm rest of the wheelchair, each of said brackets releasably engaging a respective one of said engagements for retaining said ramp on the wheelchair for storage.

2. The assembly according to claim 1, wherein said ramp has a top side, a bottom side and a perimeter edge extending therebetween, said perimeter edge having a lower side, an upper side, a first lateral side and a second lateral side, said axle slot extending from said bottom side toward said top side, said axle slot being positioned closer to said first lateral side than said second lateral side.

3. The assembly according to claim 2, wherein said bottom side has a plurality of ribs thereon, each of said ribs extending from said bottom side toward said top side for enhancing rigidity of said ramp, said ribs being spaced apart from each other and being distributed between said first lateral side and said second lateral side, said bottom side being laid against the uneven terrain such that the wheelchair can roll along said top side.

4. The assembly according to claim 2, wherein each of said engagements is positioned on said bottom side of said ramp, each of said engagements having a distal surface with respect to said bottom side, said distal surface of each of the engagements having a channel therein for conforming to a member of the arm rest, said plurality of engagements being arranged into a pair of columns of said engagements, said columns extending between said upper side and said lower side of said perimeter edge of said ramp, said columns being spaced apart from each other and being distributed between said first lateral side and said second lateral side of said perimeter edge of said ramp, said channel in each of said engagements being oriented to extend parallel to an axis extending perpendicularly through said upper side and said lower side of said perimeter edge.

5. The assembly according to claim 2, wherein said grip has a first surface and a second surface, said first surface being bonded to said bottom side of said ramp, said grip being aligned with and being coextensive with said upper side of said perimeter edge of said ramp.

6. The assembly according to claim 4, wherein each of said brackets has a front face, said front face of each of said brackets having a channel therein for accommodating the member of the arm rest, each of said brackets being aligned with a respective one of said engagements when said ramp is positioned on the arm rest, said front face of each of said brackets releasably engaging said distal surface of said respective engagement when said ramp is positioned on the arm rest.

7. A portable wheelchair ramp assembly being configured to be placed across uneven terrain thereby facilitating a wheelchair to cross the uneven terrain, said assembly comprising:

a ramp being removably coupled to an armrest configured for attachment to a wheelchair wherein said ramp is configured to be accessible to a user in the wheelchair, said ramp having an axle slot therein, said axle slot being vertically oriented wherein said axle slot is configured to accommodate a wheel axle of the wheelchair when said ramp is selectively lifted and lowered relative to the wheelchair to removably couple said armrest to the wheelchair, said ramp being positionable to extend across uneven terrain wherein said ramp is configured to facilitate the wheelchair to cross the uneven terrain, said ramp having a top side, a bottom side and a perimeter edge extending therebetween, said perimeter edge having a lower side, an upper side, a first lateral side and a second lateral side, said axle slot extending from said bottom side toward said top side, said axle slot being positioned closer to said first lateral side than said second lateral side, said bottom side having a plurality of ribs thereon, each of said ribs extending from said bottom side toward said top side for enhancing rigidity of said ramp, said ribs being spaced apart from each other and being distributed between said first lateral side and said second lateral side, said bottom side being laid against the uneven terrain such that the wheelchair can roll along said top side;

a plurality of engagements, each of said engagements being coupled to said ramp, each of said engagements engaging an arm rest on the wheelchair for storing said ramp, each of said engagements being positioned on said bottom side of said ramp, each of said engagements having a distal surface with respect to said bottom side, said distal surface of each of the engagements having a channel therein for conforming to a member of the arm rest, said plurality of engagements being arranged into a pair of columns of said engagements, said columns extending between said upper side and said lower side of said perimeter edge of said ramp, said columns being spaced apart from each other and being distributed between said first lateral side and said second lateral side of said perimeter edge of said ramp, said channel in each of said engagements being oriented to extend parallel to an axis extending perpendicularly through said upper side and said lower side of said perimeter edge;

a grip being coupled to said ramp, said grip being comprised of a resiliently compressible material wherein said grip is configured to grip the uneven terrain thereby inhibiting said ramp from sliding on the uneven terrain, said grip having a first surface and a second surface, said first surface being bonded to said bottom side of said ramp, said grip being aligned with and being coextensive with said upper side of said perimeter edge of said ramp; and a plurality of brackets, each of said brackets being coupled to the arm rest of the wheelchair, each of said brackets releasably engaging a respective one of said engagements for retaining said ramp on the wheelchair for storage, each of said brackets having a front face, said front face of each of said brackets having a channel therein for accommodating a member of the arm rest, each of said brackets being aligned with a respective one of said engagements when said ramp is positioned on the arm rest, said front face of each of said brackets releasably engaging said distal surface of said respective engagement when said ramp is positioned on the arm rest.

* * * * *